April 8, 1958 R. B. STETSON 2,830,172
PANEL ILLUMINATOR AND INDICATOR
Filed April 23, 1954
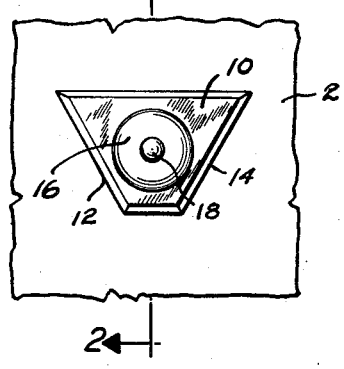
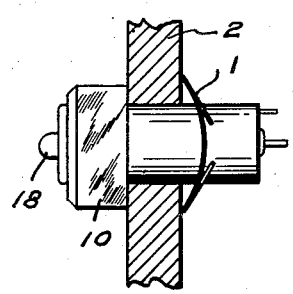
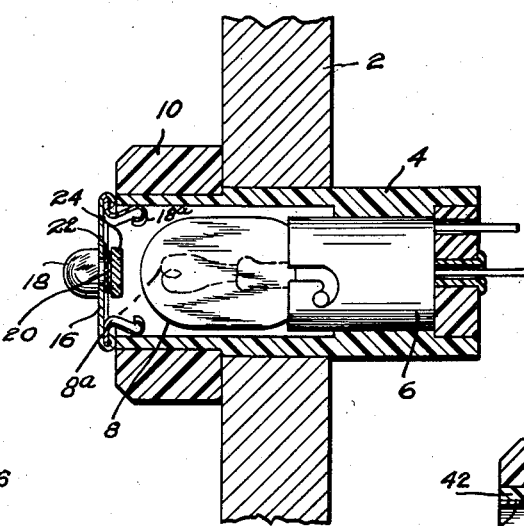
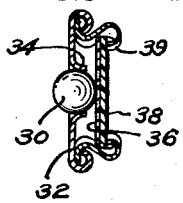
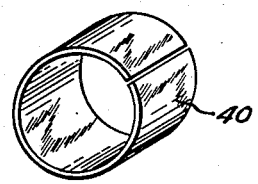
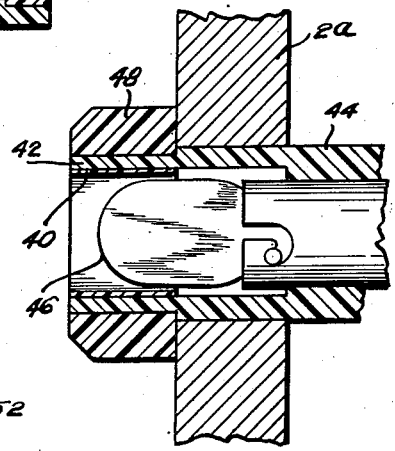
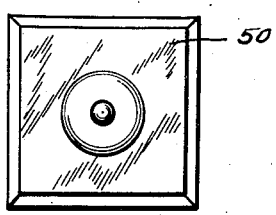
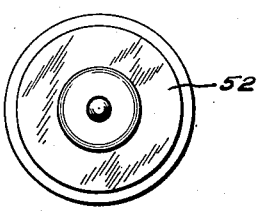
INVENTOR
Richard B. Stetson
BY
ATTORNEY

United States Patent Office 2,830,172
Patented Apr. 8, 1958

2,830,172

PANEL ILLUMINATOR AND INDICATOR

Richard B. Stetson, Maynard, Mass.

Application April 23, 1954, Serial No. 425,150

3 Claims. (Cl. 240—8.16)

This invention relates to an improved indicator light and panel illuminating device for use on panels of the class employed, for example, in connection with mounting instruments for electrical and electronic equipment.

It is a principal object of the invention to provide an improved panel illuminating device in which controlled lighting effects may be produced on selected portions of an instrument panel, and varying colors may be selectively employed in a simple and convenient manner. Another object of the invention is to combine with a panel illuminating device of the class described a controlled indicator light which is located in such relationship to the panel illuminating device as to make possible novel light contrasting effects. Still another object is to devise a panel light assembly which can be easily and cheaply manufactured and which is very readily installed in conventional instrument panels with a minimum of inconvenience.

These and other objects and novel features will be more fully understood and appreciated from the following description of a preferred embodiment of the invention selected for purposes of illustration and shown in the accompanying drawings, in which Fig. 1 is a fragmentary elevational view showing the panel illuminating device of the invention installed in a typical instrument panel member;

Fig. 2 is a cross-section taken on the line 2—2 of Fig. 1;

Fig. 3 is another fragmentary cross-sectional view showing further details of the panel illuminating device;

Fig. 4 is a fragmentary cross-sectional view similar to Fig. 3 but illustrating a light coloring cylinder installed in the prism member;

Fig. 5 is a detail perspective view of the light coloring cylinder removed from the device;

Fig. 6 is a front elevational view of a modified form of panel illuminating structure;

Fig. 7 is another front elevational view of still a further modified form of illuminating body; and Fig. 8 is a cross-sectional view of another type of lamp shielding means.

In the structure shown in the drawings, numeral 2 denotes a conventional instrument panel which may be assumed to have mounted thereon various indicator dials or other common indicator media.

In accordance with the invention, I mount the panel illuminating structure of the invention through this panel in a manner suggested in the drawings and, preferably, at a point above or approximately centrally of a group of dials or other indicators appearing on the panel, as noted above.

The principal parts of my improved panel illuminating device are best shown in Fig. 3 and include a lamp housing, a lamp and socket assembly received in the housing, a panel illuminating element supported on the lamp housing in cooperating relationship with the lamp, and a lamp shield and indicator assembly located within the housing in close proximity to the panel illuminating member.

Numeral 4 indicates the lamp housing structure which preferably consists of a hollow cylindrical body of transparent insulating material in which is received a conventional lamp socket, 6, and lamp, 8, detachably secured by a bayonet lock, as shown. An important feature of this lamp and lamp housing assembly is the arrangement of the lamp housing and the lamp in the housing. It is pointed out that the housing is chosen of a length such that it may project through the panel, 2, for a short distance and allow the lamp to also project beyond the panel surface. The projecting portion of the lamp housing is reduced in diameter to constitute a shouldered stud against which there is tightly fitted the panel illuminating element, 10, as noted in Fig. 3. A fastening, such as a speed nut, 1, is fitted over the opposite end of the housing and pressed against the panel, 2, as noted in Fig. 2.

By means of this projecting stud arrangement and by also arranging the lamp, 8, and its socket, 6, so that a part of the lamp may likewise project beyond the outer surface of the panel, 2, I am enabled to provide for rays of light radiating outwardly from the filament, 8a, and directly through the panel illuminating element, 10, in a controlled manner to shed a soft light of pleasing characteristics extending over a relatively large area of the panel.

The member, 10, is preferably composed of a clear plastic material, such as Plexiglas or the like and, in accordance with a further important feature of the invention, this transparent body may be constructed in the form of a prism of some desirable shape. Thus, in the form shown in Fig. 1, I have provided a prismatic body in the shape of a trapezoid having two sides, 12 and 14, which are inclined downwardly and toward one another in the manner shown. This arrangement of prism faces provides for flooding light over predetermined areas of the panel and thereby concentrating illumination over certain meters or dials while leaving surrounding areas less brightly illuminated.

It will be observed that the panel illuminating element is formed with a bore through which the stud portion of the housing, 4, is received. In accordance with the invention, I further provide a lamp shield member, 16, which fits into and overlies the bore and which comprises a suitably opaque substance, such as metal or other material. The shield, in one preferred form, comprises a cap having resilient retainer ears, 18a, as best shown in Fig. 3, and arranged to engage within the bore of the member, 10. The lamp shield thus described may be used to exclude passage of light from the filament, 8a, in a direction axially out of the lamp housing and thereby prevent glare. However, I prefer to utilize this lamp shield as a holder for a cooperating indicator light element, 18. This member, 18, is composed of a transparent material, such as that employed in the member, 10, for example, and is constructed of an outer hemispherical portion, as shown in Fig. 3, and an inner cylindrical stud portion, 20, which is fitted through an opening provided in the lamp shield, 16. On the cylindrical stud, 20, I secure a translucent white disc, 22, and a second transparent color disc, 24, as noted in Fig. 3. These discs cooperate with one another to permit limited passage of light in various colors through the exposed portion of the indicator, 18. This arrangement produces a pleasing contrast between the relatively bright spot of light from the member 18 and relatively soft light from the member 10.

In Fig. 8, I have disclosed a modified form of lamp shield, 32, on which a light transmitting member, 30, of spherical form is supported in a seat, 34. In this arrangement; there are provided two discs, 36 and 38, of which the disc, 36, is a translucent white filtering disc and disc, 38, is a colored transparent disc. Both of these disc members are supported between the member, 30, and ears, 39, in close contact with one another, as shown, so that light which is emanating from a lamp of the type described will be transmitted in a colored and diffused condition to illuminate the member, 30, with an eye-catching spot of color.

In Figs. 4 and 5, I have illustrated another desirable feature which may be included with either the structure shown in Fig. 3 or that shown in Fig. 8 and which consists in a replaceable cylinder, 40, of transparent plastic. This member may be of varying colors and is adapted to be snugly fitted within the reduced end, 42, of a lamp housing, 44, as shown in Fig. 4, so that light radiating from the lamp, 46, will pass through the cylinder, 40, and then, in a desired colored state, may continue through the panel illuminating member, 48. It will be understood that the arrangement shown in Fig. 4 may be employed either separately or in conjunction with a lamp shield, such as the member, 16, already described. It will also be apparent that, by employing both the coloring discs illustrated in Figs. 3 and 8 and the coloring cylinder, 40, a range of coloring effects may be produced and desirable color contrasts worked out in conjunction with an instrument panel. I may also desire to vary the shape of the panel illuminating element, 10, as, for example, by forming it in the shape of a square, as indicated by the element, 50, in Fig. 6, or in the form of a circle, as shown in the element, 52, of Fig. 7, or other geometrical shapes, such as a triangle, hexagon, octagon, parallelogram, etc.

It will be evident from the foregoing disclosure of my invention that I have provided a composite lighting assembly by means of which I can obtain simultaneously two different lighting effects, one cooperating with the other, to provide selective blended illumination. Thus, the member, 18, or the member, 30, will, in either case, produce a small colored dot of light contrasting or blending with the larger prism illuminated surface which normally glows in either clear white or transparent colors. This dot of light, in addition to its decorative appearance, acts as an indicator to call attention to the fact that the instrument is operative. It will be observed that the direction and intensity of illumination can be controlled by the size, shape, and angle of reflecting surfaces of the light prism. There is obtained a complete elimination of glare by means of the light shield and coloring discs.

While I have shown a preferred embodiment of the invention, it should be understood that various other changes and modifications may be practiced in keeping with the scope of the invention as defined by the appended claims.

I claim:

1. An improved panel illuminating device comprising an incandescent lamp housing, a lamp socket and lamp assembly supported in said housing, a transparent panel illuminating element fixed at one end of the housing in juxtaposition to the filament of said lamp, said illuminating element including means for receiving light from the filament and transmitting relatively dark and relatively light diverging beams of light radiating outwardly in a direction at right angles to the axis of the lamp, a lamp shield detachably supported in the end of the said panel illuminating member, and a transparent light indicator body mounted in an exposed end of the lamp shield.

2. A structure according to claim 1, in which the lamp shield has detachably supported therein a translucent white disc and a second transparent color disc supported in abutting relationship to the said translucent disc so that colored and diffused light is transmitted through said light indicator body.

3. A structure according to claim 2, in which the translucent white disc is arranged in contact with the light indicator body.

References Cited in the file of this patent

UNITED STATES PATENTS

| | | |
|---|---|---|
| 1,081,210 | Churchill | Dec. 9, 1913 |
| 1,739,954 | Du Pont | Dec. 17, 1929 |
| 2,144,138 | Batcheller | Jan. 17, 1939 |
| 2,165,835 | Brady et al. | July 11, 1939 |
| 2,192,345 | Foute | Mar. 5, 1940 |
| 2,309,840 | Garvert | Feb. 2, 1943 |
| 2,474,327 | Rolph | June 28, 1949 |
| 2,681,980 | Harrington | June 22, 1954 |